United States Patent [19]

Sands et al.

[11] Patent Number: 4,540,629
[45] Date of Patent: Sep. 10, 1985

[54] HOLLOW MICROSPHERES WITH ORGANOSILICON-SILICATE WALLS

[75] Inventors: Bruce W. Sands, Malvern; Robert J. Nehring, Jr., Lansdale, both of Pa.

[73] Assignee: PQ Corporation, Valley Forge, Pa.

[21] Appl. No.: 583,559

[22] Filed: Feb. 27, 1984

Related U.S. Application Data

[63] Continuation-in-part of Ser. No. 366,502, Apr. 8, 1982, abandoned.

[51] Int. Cl.$^3$ .............................................. B32B 5/16
[52] U.S. Cl. .................................... 428/402; 264/13; 428/405; 428/406; 428/429
[58] Field of Search ............... 428/402, 405, 406, 429; 264/13, 15, 12

[56] References Cited

U.S. PATENT DOCUMENTS

| | | | |
|---|---|---|---|
| 3,110,614 | 11/1963 | de Vries | 428/405 |
| 3,794,503 | 2/1974 | Netting | 428/403 |
| 4,039,331 | 8/1977 | Lee | 428/405 |
| 4,175,159 | 11/1979 | Raleigh | 428/405 |
| 4,338,375 | 7/1982 | Hashimoto et al. | 428/429 |
| 4,411,847 | 10/1983 | Netting et al. | 428/406 |

*Primary Examiner*—George F. Lesmes
*Assistant Examiner*—William M. Atkinson
*Attorney, Agent, or Firm*—Ernest G. Posner; J. S. Stephen Bobb; Fred C. Philpitt

[57] ABSTRACT

Hollow microspheres of reduced surface energy and reactivity and of improved packing and sphericity are prepared by simultaneously forming said microspheres and reacting them with an organosilicon compound. The microspheres are prepared by spray drying a solution of alkali metal silicate and a "polysalt." The organosilicon is present as the microspheres are formed, penetrates and reacts to form a shell consisting of a silicate, polysalt and the organosilicon compound. The resulting product is more discrete, more free-flowing, has better packaging characteristics, improved packing factor and improved filler properties when compared to prior-art microspheres.

22 Claims, No Drawings

4,540,629

HOLLOW MICROSPHERES WITH ORGANOSILICON-SILICATE WALLS

This application is a continuation in part of our copending patent application U.S. Ser. No. 366,502, filed Apr. 8, 1982, now abandoned.

BACKGROUND OF THE INVENTION

This invention relates to hollow microspheres with essentially siliceous shells. In particular, the invention comprises hollow microspheres of a new composition that have improved physical characteristics and a low surface energy and methods for preparing them.

Essentially siliceous hollow microspheres are well known articles of commerce which can be used as fillers for various polymer systems, explosives, syntactic foams, etc. These products are made in a number of ways, the most common being passing certain solid particles of glass-forming materials through spherulizing furnaces or spray drying solutions of film-forming materials. The former results in a fused surface, a modified surface energy and somewhat lower chemical reactivity. The spray drying methods which are disclosed in U.S. Pat. Nos. 3,699,050; 3,794,503; 3,796,777; 3,838,998 and 3,888,957 appear to form microspheres that are more reactive. While the microspheres exit the spray dryer as discrete spheres, their high energy, polar and reactive surfaces quickly result in particle agglomeration and caking. These properties often result in breakage during processing and prevent the microspheres from settling well and expelling air from containers. Maintaining the hollow integrity of these products is an important consideration in their value. Solid flow conditioning agents are usually added to the microspheres after spray drying in an effort to mitigate these problems. These additives are not totally effective, and detract from product quality because of their higher density and their porous nature. These additives adhere to the microspheres so that their smooth outer surfaces become irregular. It is apparent that changing the composition, reducing the reactivity and lowering the surface energy of these microspheres as they are forming results in important product improvements.

One method of modifying the surfaces of some siliceous fillers has been to coat them with various materials such as organosilanes after the materials have been manufactured. U.S. Pat. Nos. 3,915,735 and 4,141,751 teach the silane coating of microcrystalline silica by pouring or spraying the silane onto a tumbling bed of the silica. U.S. Pat. No. 4,134,848 teaches slurrying a hollow microsphere with a solution containing a silane to form a coated microsphere. There are, of course, numerous teachings in the literature to silane coating various substrates, but the references cited herein appear to be the most relevant. This solution to the problem is an "additive approach" and not completely satisfactory since it requires a process step after the microsphere has been produced. This post-coating approach is also flawed because of the difficulty in obtaining uniform coatings while maintaining processing conditions that do not damage or destroy the microspheres.

SUMMARY OF THE INVENTION

Post-coating previously prepared microspheres with silanes as taught by the prior art does not provide the product improvements of our composition. We have found that by forming the microsphere by spray drying and exposing it during said formation to an organosilicon compound in an aerosolized form, a much improved product is realized. The microsphere is prepared by spray drying a solution formed by mixing an alkali metal silicate and a polysalt. The organosilicon compound, such as silane, is atomized into the spray dryer at the same time but in a different feed stream. The organosilicon compound reacts with, becomes completely integrated into the wall of the microsphere which when recovered from the spray dryer remains discrete and free-flowing. The product remains completely free-flowing for an extended period of time under a variety of packaging and atmospheric conditions. The product from the spray dryer may be useful, or a further reduction of the moisture level can be accomplished by drying in any convenient manner. In addition, the product settles and replaces air rapidly and efficiently from containers. A further advantage is that the less reactive microspheres appear to be more perfect and less porous; i.e., there are fewer holes and fragments in the improved product than in the product without the organosilicon compound. The improved microspheres also appear to be more spherical and have smoother surfaces. These improvements provide better filler properties and overall utility. The lower surface energy and reactivity also contribute to the usefulness of the microspheres as fillers since the viscosity of a filled liquid system is lower, and a higher loading of microspheres is possible.

The improved microsphere products require no solid flow-conditioning agents and have improved moisture-resistivity over microspheres requiring flow-conditioning agents. The product with the organosilicon integrated into the shell or wall also provides filled polymer systems of lower viscosity during preparation. They also pack better so that processing and packaging are improved.

THE INVENTION

Nearly any siliceous film-forming combination that is soluble in a volatile solvent can form the primary microsphere of our composition. The most useful film-forming system for our composition is a combination of alkali metal silicate and a polysalt. U.S. Pat. Nos. 3,796,777; 3,794,503 and 3,888,957, which are hereby incorporated by reference, describe these systems in detail and define "polysalts" as inorganic salts with anion-to-cation ratios that are reduced when the salts dissolve and become hydrolyzed. Complex borates and phosphates are useful salts. We prefer ammonium pentaborate (APB), sodium pentaborate (SPB) or sodium hexametaphosphate (SHP). We especially prefer APB.

The silicates that form an important part of our composition are commercially available solutions or soluble glasses or powders. The solutions contain 15 to 60% total solids and 1.5 to 4.0 moles of $SiO_2$ per mole of $M_2O$ wherein M is an alkali metal. We prefer sodium silicates that contain 1.8 to 2.8 moles of $SiO_2$ per mole of $Na_2O$.

A homogeneous solution of the silicate and "polysalt" is formed by adding the salt solution to the silicate under agitation. The ratio of "polysalt" solids to silicate solids should be between 0.02:1.0 and 3.0:1.0, and the homogeneous solution to be spray dried can have about 5 to 50% total solids. If a solution of APB and sodium silicate is used, the total solids would be 5 to 35% with 3 to 15% as APB; the ratio of APB solids to silicate solids should be between 0.03:1 and 0.5:1; preferably between 0.06:1 and 0.5:1. A solution having 0.02 to 0.3 parts by weight (pbw) of SPB per pbw of silicate solids contains 17.4 to 34.5% total solids and 6 to 7% SPB solids. A solution having 1 to 3 pbw of SHP per 1 pbw of silicate solids contains 29.6 to 48% of total solids.

Many organosilicon compounds are useful in the composition of our invention; however, they must have certain structural features and properties. The compound must have at least one thermally stable and nonhydrolyzable group, and one or more highly reactive and/or hydrolyzable groups for bonding with the silicate-polysalt portion of the structure. Preferably, these reactive groups should lead to products that have high vapor pressures such as methanol, acetic acid, ammonia and the like. Halides are useful and are less desirable only because the resulting products are corrosive.

The organosilicon compound can be used neat, as an aqueous or nonaqueous solution, or as an aqueous or non-aqueous dispersion. The compound, solution, or dispersion should be readily atomized so that the droplets injected into the spray dryer are as small as possible and provide the maximum uniform interaction with the silicate-polysalt substrate. The enduring organic group, often called the organo-functional group, should be thermally and hydrolytically stable to the temperatures required in processing.

There are many organosilanes and silicones that can be used in preparing the composition of our invention. These materials can be represented by the formula:

$$R_nSiX_{4-n}$$

where n=1-3, X represents H, Cl, Br, F or OR', wherein OR' is an alkoxy such as $OCH_3$, $OCH_2CH_3$, etc. or acetoxies, and wherein R represents alkyl, alkenyl or aryl and their derivatives having varying functionalities, but which remain thermally and hydrolytically stable and bound to the silicon.

It is preferred that X be readily hydrolyzed so that upon introduction to an aqueous environment the species $R_nSi(OH)_{4-n}$ is produced and when in the presence of the silicate in the spray dryer it reacts therewith to form a polymeric silane-silicate structure which constitutes the wall and surface of our hollow microsphere. It is also preferred that n=1 so that there are several bonds formed between the silicate and the organosilane according to the following equation:

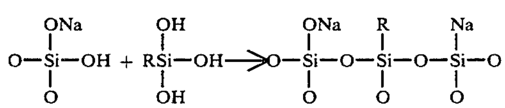

Silicate Organosilane Wall and Surface of the Microsphere

While silanes with n=3 are useful in the process of our invention, they are not so completely integrated into the wall of the microsphere, as indicated by the following representation:

$$Si—OH + R_3SiOH \quad Si—O—SiR_3$$

Materials that hydrolyze to form a compound having a silanol group can also be used, such as $R_3SiOSiR_3$ and $R_3SiNHSiR_3$. Structures such as $R_nSi—H_{4-n}$ or low molecular weight oligomers may also be useful. These structures would also include any silicone oligomer or polymer which has SiOH (silanol) functionality or potential, such as $HO[Si(Me)_2O]_nH$. We prefer R to be methyl, $CH_3$. We also prefer compounds represented by the formulas:

$$HSiMe_2O(MeSiHO)_nMe_2SiH;$$

$$Me_3SiO(MeSiHO)_nSiMe_3; \text{ or}$$

$$HSiMe_2O(SiMe_2O)_nMe_2SiH;$$

wherein n=2 to 20

These materials integrate into the shell of the microsphere very well.

Silanes are the preferred organosilicon compounds with alkyl alkoxy silanes and aryl alkoxy silanes being most preferred since the hydrolysis products include easily evaporated alcohols. Methyl-, ethyl-, propyl-, butyl-, vinyl-, and phenyl-trimethoxysilane are examples of individual silanes that are useful in the process and hollow microsphere of our invention. These silanes with ethoxy or propoxy groups substituted for the methoxy group are useful. We also prefer to use methyltrimethoxysilane to form the desired microspheres.

The forming hollow microspheres have a high degree of moisture in their walls, surfaces, and surrounding them, and are alkaline as well, thereby providing a very reactive environment for the reaction and equilibration of the organosilicon compound into the siliceous wall of the hollow microsphere. The hydrolysis products, such as $CH_3OH$, $CH_3CH_2OH$, $H_2$, etc., and water formed by the condensation reaction are removed in the spray dryer and any possible post-drying step. Acid hydrolysis products such as acetic acid, HCl, etc. are probably neutralized by the basis sphere and may be retained as sodium salts of the acid.

The desired composition and lower surface energy can be achieved when 0.05 to 5.0% of the organosilicon based on the weight of the microsphere forming solids is used. Good results are obtained at levels of 0.1 to 3.0%. We prefer about 1%, depending on the organosilicon compound used.

The composition of our invention can be prepared as follows. The siliceous film-forming solution (usually a silicate-"polysalt" solution) is prepared, observing whatever controls of temperature, mixing and order of addition required. A solution or dispersion of the compound in a volatile, water miscible solvent or the neat organosilicon liquid that can be sprayed or atomized is prepared. This preparation can involve hydrolysis or its equivalent to form the readily atomized solution. Both the film-forming solutions and the liquid containing the organosilicon compound are injected into a spray dryer at the same time, but through separate spray nozzles or atomizer disks. Nearly any conventional spray drying equipment with either spray nozzles or disk atomizers can be used for our process. The separate injection points for the organosilicon compound should be close, so that as the microsphere forms by the drying and expansion of a droplet of the film formng solution, it encounters the organosilicon material which immediately substantially penetrates and interacts with the wall of the microsphere, thereby forming the desired microsphere composition.

The inlet temperature of the spray dryer can be 150° to 500° C. with an outlet temperature of 100° to 400° C. The product recovered from the spray dryer can be ready for packaging and/or use, even though it may contain 10 to 17% water. Because of the lower reactivity and surface energy, these materials remain free-flowing in spite of their high water content. The spray dryer product can be dried further by heating the hollow microspheres to temperatures between 70° and 400° C. slowly in any convenient manner. We prefer that the microspheres not be cooled down before this drying step. If they are cooled, they must be heated very carefully to prevent overexpansion and/or breakage. The product of this drying step will have less than about 10% and probably greater than about 5% water as chemically bound water.

The product microspheres are and remain free-flowing at high moisture levels (up to 15% or more) as well as lower levels (<10%) and neither product requires the addition of flow control agents. Products at both moisture levels remain free-flowing for long periods of time, while the products with the lowest moisture levels are free-flowing indefinitely for all practical purpose. The particle size of the product can be varied between 5 and 300 microns with bulk densities (BD) of 0.02 to 0.24 g/cm$^3$, true particle densities (TD) of 0.05 to 0.90 g/cm$^3$ and effective densities (ED) of 0.05 to 0.90 g/cm$^3$. The BD is simply the weight of the microspheres per unit of volume. TD is the weight of microspheres replacing a volume of air in an air pycnometer and the ED is a measure of the filling capacity of the material in a liquid. The ratio TD/BD (the inverse is the packing factor) is important in that it is an indication of the integrity of the product. As the product microspheres become more perfect by preparing the microsphere of our invention, i.e., containing fewer fragments and fewer porous entities, this ratio approaches 1. We consider TD/BD ratios of 1.2 to 1.9 that are characteristic of our product to be excellent. The prior art materials have TD/BD ratios of 2 or more. These lower TD/BD ratios are also important in that they are indicative of better particle packing and product handling and packaging characteristics. Other product advantages include decreased moisture sensitivity when compared with microspheres that do not exhibit the organosilicon-silicate structure of our microspheres. Since our products are more moisture resistant, they exhibit lower pH and reduced solubility of Na$_2$O, SiO$_2$ and B$_2$O$_3$ in aqueous environments.

Even more important are the improved filler properties of our microspheres. Since the product contains fewer fragments and is less porous, it more effectively displaces the liquid in which it is used than prior art microspheres for each unit of weight. While improved displacement is important, the interaction between the microsphere and the liquid (usually but not always a polymer to be set later) is also important in establishing value of the product as a filler. Low TD and lower porosities indicate good filler properties. We find that the microspheres of our invention have porosities that are about 0.3 to 0.6 of those exhibited by prior art spray dried microspheres even if they have been coated with an organosilicon after formation of the microspheres is completed. We also find that microspheres of our invention have less effect on the viscosity of organic liquids and presumably liquid polymer systems prior to setting. For example, our microspheres increase the viscosity of dioctyl phthalate (DOP) by 0.05 to 0.7 of the increase shown when prior art microspheres are used. Such differences are most conveniently determined at high loading; we have used 55% v/v. A number of other property differences are illustrated in the examples.

The structure of our microspheres is different from that of the prior art materials which are coated after formation of the microsphere is completed. The structure of our microspheres is characterized by an integrated microsphere wall wherein the organosilicon compound is within the wall as well as forming a portion of the outer surface of said wall. This structure is the result of penetration of the forming wall by the organosilicon compound. It is immaterial whether this penetration is complete, i.e., reaching the inner wall surface, as long as it penetrates deeply enough to provide the desired product characteristics. Either complete or the deep penetration will provide the desired product characteristics and both embodiments are included in the meaning of "integrated." These characteristics include TD/BD ratios of 1.2 to 1.9, porosites (calculated as described in Example 5) of less than about 10 and viscosities of a 55% v/v dispersion of microspheres in DOP of 2500 to 5500 cp. These characteristics contrast strikingly with those of the prior art post-coated products wherein the organosilicon compound is only on the surface of the microsphere and there is a boundary between the inorganic microsphere and organosilicon compound. Such materials have a TD/BD ratio of substantially more than 2, porosities of more than 10 and viscosities in DOP of substantially more than 6000 cp.

EXAMPLES

Certain embodiments of our invention and certain aspects of the prior art are illustrated in the examples. They are not meant to establish the scope of our invention. The scope is established in the disclosure and recited in the claims. The proportions are in parts by weight (pbw), parts by volume (pbv), percent by weight (% w/w) or percent by volume (% v/v) unless otherwise indicated.

Example 1

This example illustrates the prior-art method of preparing microspheres using the film-forming system of sodium silicate and a polysalt. Sodium silicate (500 pbw of 2.0 SiO$_2$/Na$_2$O 44% solids) was thoroughly mixed with 500 pbw of a 10% w/w APB solution heated above 60° C. Mixing was continued until any lumps were dispersed. The resulting homogeneous solution was fed to a spray dryer with an inlet temperature of 400° to 450° C. and an outlet temperature of 140° to 180° C. The atomizer pressure was 4 to 8 kg/cm$^2$. These spray dryer conditions were varied to provide the products described hereinafter. The product recovered was subjected to a further drying step in an oven. The temperature was initially below 100° C. and gradually raised to about 300° C. in about an hour. Heating continued until the product contained less than 3.3% water. Both products caked very quickly and were therefore not suitable for the projected use.

Example 2

The process described in Example 1 was repeated except that a finely divided silica was added to the products exiting the spray dryer to prevent caking. Sufficient of the silica was used to render the products free-flowing—about 6 to 7% was required. One product (Run III-1) made in this manner had a BD of 0.105 g/cm$^3$. Another product (Run II-2) had a BD of 0.090 g/cm$^3$. The properties of these materials are summarized and compared with other hollow microsphere products in Table 1.

Example 3

A hollow microsphere product III-2 similar to that produced by Run III-1 was coated with a silane as described in the prior art, which we call post-coating since it occurs after formation and any subsequent processing of the spheres. Methyltrimethoxysilane (2.5 pbw) was prehydrolyzed in 45 pbw of methanol containing 2.5 pbw of water and 1 drop of acetic acid. The mixture was allowed to stir for 5 minutes. The hollow microspheres were mildly agitated in a blender while the pre-hydrolyzed silane was added. After adding the silane blending was continued for an additional 15 minutes. The product (Run IV-1) was dried in an oven at 105° C. for about 16 hours. The general characteristics of the starting microspheres III-2 and the silane-coated product IV-1 are given in subsequent tables.

Example 4

The process described in Example 1 was repeated except that a hydrolyzed silane was introduced into the spray dryer. The silane was metered to a two-fluid nozzle located in the side of the spray dryer below the atomizing means for the silicate-polysalt injection. The silane was methyltrimethoxysilane reacted at a level of 20% w/w in water adjusted to a pH of about 3.5 with 0.05% w/w of acetic acid. The rate of silane addition to the spray dryer ws varied to achieve levels of treatment of 0.5, 1 and 2.0 w/w. The products from both the spray dryer and the dryer were free-flowing and have remained so for over a year. In another run a solution of 10% w/w methyltrimethoxysilane in water was used. After the feed rate of the silane was adjusted to provide a level of 1% silane a sample designated V-3 was taken after the second drying step. A second sample V-4 was taken after the spray drying condition had been changed to provide a lower density product. This silane and the dosage was the same. This sample was also subjected to the secondary drying step to reduce the moisture level to less than 7% w/w.

Example 5

The properties of the products prepared as described in Examples 2, 3 and 4 were determined and are summarized in Table 1.

TABLE 1

Properties of Microspheres Comparing the Products of our Invention with Those of the Prior Art

| Property | V-4 | V-3 | IV-1 | III-1 | II-2 | III-2 |
|---|---|---|---|---|---|---|
| TD (g/cm$^3$) | 0.183 | 0.207 | 0.257 | 0.224 | 0.223 | 0.258 |
| ED (g/cm$^3$) | 0.169 | 0.193 | 0.208 | 0.197 | 0.181 | 0.222 |
| BD (g/cm$^3$) | 0.128 | 0.125 | 0.106 | 0.105 | 0.090 | 0.101 |
| TD/BD | 1.43 | 1.66 | 2.42 | 2.13 | 2.48 | 2.55 |
| % Porosity | 8.2 | 7.3 | 20.8 | 13.1 | 20.3 | 15.3 |
| LOI | 5.9 | 5.9 | — | 5.7 | — | — |
| LOD | 0.22 | 0.21 | — | 0.47 | — | — |
| Surface Area, M$^2$/g | 2.49 | 1.42 | — | 8.83 | — | — |

We have calculated the percent porosity using the following equation.

$$\% P = \frac{1 - \frac{ED}{TD}}{1 - \frac{ED}{2.45}}$$

ED and TD are as previously defined and 2.45 g/cm$^3$ is the density of the wall.

Example 6

The example illustrates the advantage of the microspheres of our invention in regard to the viscosities of liquid systems when filled with microspheres. DOP was used as the organic liquid and a 55% v/v loading of microspheres conveniently indicated the differences between our microspheres and those of the prior art. The viscosities were determined on a Brookfield viscometer, Model RVT, with a #4 spindle at 5 rpm, 5 minutes after the microspheres were dispersed in the DOP. These results are summarized in Table II. Viscosities of DOP loaded with 55% v/v of the microspheres of our invention can be 2500 to 5500 cp.

TABLE II

Viscosities of Suspensions of Microspheres in DOP

| Sample Number | Viscosity cp 5 min. |
|---|---|
| V-4 | 3,200 |
| V-3 | 2,800 |
| IV-1 | 9,200 |
| III-2 | 16,600 |
| III-1 | 8,800 |
| II-2 | 13,400 |

These results show clearly that the microspheres of our invention (samples V-4 and V-3) do not interact with the organic matrix or with themselves as strongly as do the prior-art materials including the silane post-coated material, sample IV-1.

We claim:

1. Hollow microspheres of 5 to 300 microns diameter with shells containing alkali metal silicate, a polysalt, an organosilicon compound multiply bonded within said silicate shell, said microspheres being characterized in that:

(a) the ratio of polysalt solids to silicate solids is between 0.02:1 and 3.0:1, said polysalt being an inorganic salt of an alkali metal and/or ammonium cations wherein the anion to cation ratio is reduced when the salt is dissolved and becomes hydrolyzed and said alkali metal silicates having 1.5 to 4.0 moles of SiO$_2$ per mole of M$_2$O wherein M is sodium or potassium;

(b) the organosilicon constitutes 0.01 to 4.0% by weight of the microspheres, said organosilicon being the thermally and hydrolytically stable portion of an initial organosilicon compound having at least one thermally stable and non-hydrolyzable organic group and two or three reactive groups;

(c) the ratio of true density to bulk density being between 1.2 and 1.9, the true density being 0.05 to 0.90 g/cm$^3$ and the bulk density being 0.05 to 0.24 g/cm$^3$;

(d) the porosity (%P) of 5 to 10% as calculated by the formula $$\% P = \frac{1 - \frac{ED}{TD}}{1 - \frac{ED}{2.45}}$$

wherein ED is the effective density which has a value of 0.05 to 0.90 g/cm³ and TD is the true density as recited in section (c) and 2.45 is the density of the wall in g/cm³.

2. The hollow microspheres of claim 1 wherein said polysalt is ammonium pentaborate, the weight ratio of ammonium pentaborate solids to silicate solids being between 0.03:1 and 0.5:1, sodium pentaborate, the weight ratio of sodium pentaborate solids to silicate solids being between 0.02:1 and 0.3:1; or sodium hexametaphosphate, the weight ratio of sodium hexametaphosphate solids to silicate solids being between 1:1 and 3:1.

3. The hollow microspheres of claim 1 wherein the initial organosilicon compound is represented by the formula:

$$R_nSiX_{4-n}$$

where n=1 or 2, X represents H, Cl, Br, F or OR' wherein OR' is an alkoxy that provides a volatile product upon hydrolysis or thermal decomposition, and where R represents an alkyl, alkenyl or aryl group and their functional derivatives which remain thermally and hydrolytically stable and bound to the silicon.

4. The hollow microspheres of claim 3 wherein n=1.

5. The hollow microspheres of claim 1 wherein the initial organosilicon compound is represented by the formula $R_nSi-H_{4-n}$ wherein R is an aliphatic hydrocarbon and n is 1 or 2.

6. The hollow microspheres of claim 5 wherein R is methyl.

7. The hollow microspheres of claim 1 wherein the initial organosilicon compound is an organosilane.

8. The hollow microspheres of claim 7 wherein the organosilane is an alkylalkoxy silane or an arylalkoxy silane.

9. The hollow microspheres of claim 7 wherein the organosilane is selected from the group consisting of methyl-, ethyl-, propyl-, butyl-, vinyl- and phenyltriethoxysilane and methyl-, ethyl-, propyl-, butyl-, vinyl- and phenyl-tripropoxysilane.

10. The hollow microspheres of claim 7 wherein the organosilane is methyltrimethoxysilane.

11. The hollow microspheres of claim 1 wherein the weight ratio of ammonium pentaborate solids to silicate solids is between 0.06:1 and 0.5:1.

12. The hollow microspheres of either of claims 1 or 11 wherein said microspheres contain 10 to 17% by weight of moisture including chemically bound water.

13. The hollow microspheres of any of claims 1, or 6 wherein said microspheres contain 5 to 10% by weight of moisture including chemically bound water.

14. The process of preparing hollow microspheres of 5 to 300 microns diameter with shells containing alkali metal silicate and a polysalt, and an organosilicon compound multiply bonded within said silicate shell, comprising the steps of:
(a) forming a homogeneous solution of 0.02 to 3.0 parts by weight of a polysalt for each part by weight of an alkali metal silicate, said "polysalt" being an inorganic salt of an alkali metal and/or ammonium cations wherein the anion to cation ratio is reduced when the salt is dissolved and becomes hydrolyzed, said alkali metal silicates having 1.5 to 4.0 moles of $SiO_2$ per mole of $M_2O$, wherein M is sodium or potassium;
(b) injecting said homogeneous polysalt-silicate solution into a spray dryer with an inlet temperature of about 150° to 500° C. and an outlet temperature of about 100° to 400° C., and simultaneously injecting into said spray dryer a liquid containing an organosilicon compound through a separate injection device in close proximity to the injection point for the homogeneous polysalt-silicate solution, said organosilicon compound having at least one thermally stable and non-hydrolyzable organic group and two or three reactive groups; and
(c) recovering the product from the spray dryer.

15. The process of claim 14 wherein the product recovered from the spray dryer is further dried slowly at temperatures between 70° and 400° C.

16. The process of either of claims 14 or 15 wherein the organosilicon compound is represented by the formulas:

$$HSiMe_2O(MeSiHO)_nMe_2SiH; \text{ or}$$

$$HSiMe_2O(SiMe_2O)_nMe_2SiH;$$

wherein n=2 to 20.

17. The process of either of claims 14 or 15 wherein said polysalt is ammonium pentaborate, the weight ratio of ammonium pentaborate solids to silicate solids being between 0.03:1 and 0.5:1; sodium pentaborate, the weight ratio of sodium pentaborate solids to silicate solids being between 0.02:1 and 0.3:1; or sodium hexametaphosphate, the weight ratio of sodium hexametaphosphate solids to silicate solids being between 1:1 and 3:1.

18. The process of claim 17 wherein the initial organosilicon compound is represented by the formula:

$$R_nSiX_{4-n}$$

where n=1 or 2, X represents Cl, Br, F or OR' wherein OR' is an alkoxy that provides a volatile product upon hydrolysis or thermal decomposition, and where R represents an alkyl, alkenyl or aryl group and their functional derivatives which remain thermally and hydrolytically stable and bound to the silicon.

19. The process of either of claims 14 or 15 wherein the organosilicon compound is an alkylalkoxysilane or an arylalkoxysilane selected from the group consisting of methyl-, ethyl-, propyl-, butyl-, vinyl- and phenyltriethoxysilane and methyl-, ethyl-, propyl-, butyl-, vinyl- and phenyl-tripropoxysilane.

20. The process of claim 19 wherein the alkylalkoxysilane is methyltrimethoxysilane.

21. The process of claims 14 or 18 wherein the organosilicon compound is represented by the formula $$R_nSi-H_{4-n}$$

wherein R is an aliphatic hydrocarbon and n is 1 or 2.

22. The process of claim 21 wherein R is methyl.

* * * * *